Sept. 24, 1963   H. E. THOMPSON, JR   3,104,787
VALVE DEVICE COMPRISING RESILIENT WALLED NIPPLE
WITH SLITTED OPERTURE NORMALLY BIASED CLOSED
Filed Sept. 29, 1960
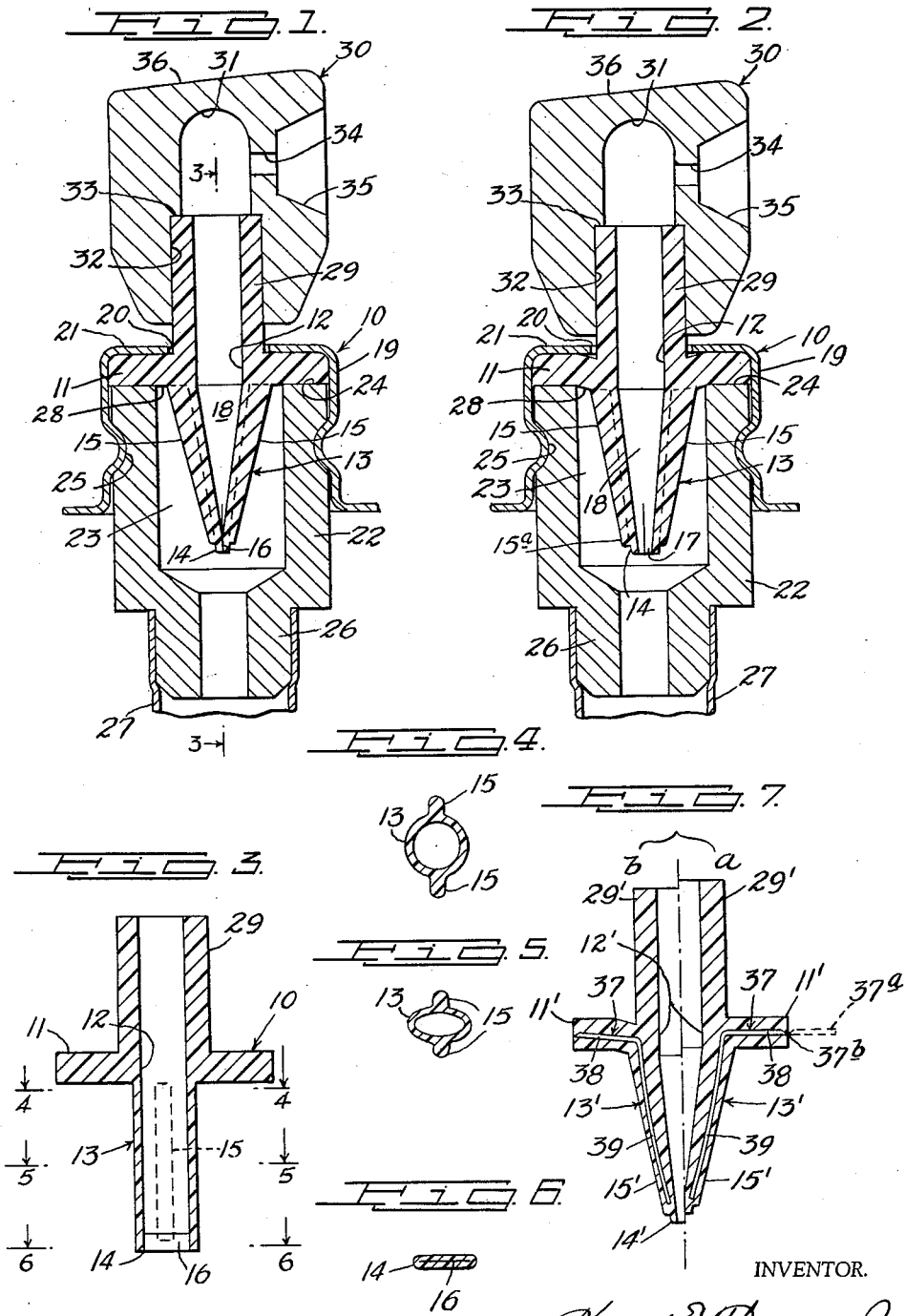
INVENTOR.
Howard E. Thompson Jr United States Patent Office 3,104,787
Patented Sept. 24, 1963

3,104,787
VALVE DEVICE COMPRISING RESILIENT WALLED NIPPLE WITH SLITTED APERTURE NORMALLY BIASED CLOSED
Howard E. Thompson, Jr., 51 Ridgewood Ave., Glen Ridge, N.J.
Filed Sept. 29, 1960, Ser. No. 59,231
7 Claims. (Cl. 222—490)

This invention relates to valve devices for freely introducing fluids under pressure into containers or enclosures therefor and controllably releasing such fluids therefrom. More particularly, the invention relates to valves of the class described, wherein a valve device is fashioned from a unitary mass of resilient material, providing both a mounting means for attaching the same to a container and integral fluid passage forming means deformable to establish communication with the interior of a container.

There are many instances in which it is desired to pressure fill containers with fluids such as gases, liquid gas mixtures, and mixtures thereof with finely divided solid material under conditions such that the fluid can be freely introduced into the container with assurance that inadvertent release or discharge of the fluid will be prevented while, at the same time, permitting easy controlled discharge of the fluid when desired. For example, in the area of inflatable devices, such as air mattresses and rafts, life jackets and swimming aids, vehicle tires and tubes and the like, this combination of conditions is generally desired. Also, in the area of aerosol packaging and dispensing, this combination of conditions is of primary importance.

In certain of its broader aspects, the invention can be described as a valve device comprising a unitary body of flexibly deformable material, having an annular flange portion surrounding a central aperture and providing mounting means for securing the device to a fluid container, an integral extension protruding from one inner surface of said flange providing a passage in alinement with said aperture adapted to extend inwardly of a container, said extension being of relatively thin walled tubular contour adjacent said flange and having a plurality of radially protruding external ribs, uniformly spaced circumferentially thereof, which integrally join said flange and are movable therewith, the walls of said extension being substantially perpendicular to said flange at points intermediate said ribs and angularly disposed with respect to said flange in alinement with said ribs to converge and meet at the axis of said extension forming a closure end remote from said flange, the thin wall structure of said extension protruding slightly beyond the convergent ends of said ribs, disposing inner surfaces thereof in juxtaposition at said closure end of the extension, effecting a fluid seal which is augmented by fluid pressure externally of said extension and against the inner surface of said flange, and said ribs being of sufficient rigidity so that pressure on the outer surface of said flange annularly of said aperture and in the direction of said extension causing inward flexing of said flange imparts a rocking action to said ribs and divergent movement at the closure end of said extension to separate said juxtaposed wall portions and establish a fluid passage through said closure end thereof.

The ribs can be suitably stiffened in various ways. Preferably, they are merely heavier portions of the resilient material from which the device is fashioned deriving the required strength and rigidity from the greater mass and cross-sectional contour. Alternatively, the ribs can have supplemental stiffening means associated therewith, and suitably enveloped therein in the molding of the device.

The actuation of the valve to discharge fluid under pressure from a container can be effected by any means which will cause an inward deflection of the mounting flange annularly of the aperture therethrough. Thus, for example, in air mattresses or other devices capable of inflation by mouth, the mounting flange can constitute the mouthpiece during inflation, and deflation can be accomplished by inward flexing of the mounting flange, using a suitable available implement such as a coin or even a fingernail.

In adapting the device to aerosol containers, on the other hand, it is practical to include as an integral part of the valve device a tubular extension protruding outwardly from the mounting flange in alinement with the aperture therein. Such tubular extension would serve the multiple purpose of facilitating pressure filling of aerosol containers, providing a support for various discharge nozzles and, at the same time, properly concentrating the downward force applied when it is desired to open the valve for discharge of fluid. It will be understood, however, that the basic principles of the invention can readily be adapted for use with many types of special means for introducing fluid to a container and providing the necessary inward deflection of the mounting flange to discharge fluid therefrom.

Many types of flexibly resilient material can be employed in fashioning valve devices in accordance with the present invention and the selection of material will depend, in part, upon the peculiarities of the fluid to be handled and the corrosive or reactive qualities which it may possess. The valve devices, for example, may be fashioned from natural rubber, various synthetic rubbers, as well as from suitably flexible thermoplastic and thermosetting synthetic plastics and resins. It will also be apparent that the selection of material will depend, in part, upon the contemplated pressure in the type container for which it is intended and that of the size of the device can be widely varied in the various uses and adaptations thereof. It is to be understood, therefore, that the invention concerns the basic structure of a valve device as an integrally molded or otherwise fashioned body of resiliently flexible material and is not limited to any particular size of device or specific material for producing the same.

The invention will be more readily understood from a consideration of the following specification and the accompanying drawing, wherein essential details of the invention are described and illustrated in terms of a preferred adaptation thereof to aerosol valves.

In the drawing:

FIG. 1 is an enlarged diagrammatic sectional view of a valve device in accordance with the present invention associated with related parts of an aerosol container and showing the device in the closed position.

FIG. 2 is a sectional view, similar to FIG. 1, but showing the device in the open position.

FIG. 3 is a sectional view of the valve device per se taken on the line 3—3 as shown in FIG. 1.

FIG. 4 is a sectional view along the line 4—4 of FIG. 3.

FIG. 5 is a sectional view along the line 5—5 of FIG. 3.

FIG. 6 is a sectional view along the line 6—6 of FIG. 3; and

FIG. 7 is a bracketed sectional view of a valve unit per se, similar to the showings in FIGS. 1 and 2, but including a modified reinforcing means and indicating at (a) the closed position and at (b) the open position of the valve device.

In FIGS. 1 to 6 of the drawing, there is shown a valve device 10 in accordance with the present invention embodying a mounting flange 11, having a central aperture 12 registering with an inward extension 13 terminating in a closure end 14 remote from the flange 11. As evident from the drawing, the device is a unitary formed mass of resiliently flexible material and the extension 13 is provided with protruding ribs 15 which extend radially from the relatively thin walled structure of the extension 13 and are integral therewith and with the flange 11 imparting rigidity to the extension 13 at points uniformly spaced circumferentially thereof. Two such ribs 15 have been shown in the drawing, but it is understood that the plurality of ribs may be two, three or more such ribs at uniformly spaced intervals circumferentially of the device. It will be noted, from a consideration of FIGS. 1 and 2 on one hand, and FIG. 3 on the other hand, as well as from a consideration of FIGS. 4 to 6, that the walls of the extension 13 points intermediate the ribs 15 extend substantially perpendicularly to the flange 11; whereas, the ribs 15 and the wall portions of the extension 13, in alignment therewith, converge and meet adjacent the closure end 14 of the device. It will also be noted that the ribs 15 terminate slightly short of the end 14 and that there is a small area 16 (note FIGS. 1, 3 and 6) where the walls of the extension 13 are in juxtaposition and where any pressure externally of the extension 13 will tend to support such surfaces in close bearing and fluid sealing engagement.

As the flange 11 is flexed downwardly at portions thereof peripherally of the central aperture 12, as shown in FIG. 2, a rocking action is imparted to the ribs 15 which are integral therewith, causing the lower ends 15a to separate and, at the same time, separate the juxtaposed extension walls at the area 16 to provide a passage or opening 17 communicating with the inner chamber 18 of the extension and the alined aperture 12 of the mounting flange. Thus the downward flexing of the flange causes an opening of the valve device against pressure which is acting externally of the extension 13, so that fluid may freely pass upwardly through the device. Conversely, it will be understood that pressure feeding of fluid downwardly through the device will similarly cause the ribbed portions of the extension 13 to pivot or rock from the closed position, shown in FIG. 1, to the open position, shown in FIG. 2. It will further be noted that a pressure within a container which acts on what would be the exterior surface of the extension 13 also acts upwardly against the inner surface of the flange 11, tending to rock the flanged portions of the device into convergent or valve closing position; thus, the device is doubly urged into closing position by internal pressure within a container, but both such closing actions are overcome by the inward displacement or deflection of the mounting flange peripherally of the central aperture 12 when it is desired to open the valve for discharge of fluid.

The flange 11 may be cemented, clamped or otherwise secured to a container. For purposes of illustration, the flange 11 has been shown as clamped in a part of an aerosol container between a container part 19 of generally cup-shaped contour, having an aperture 20 in an upper wall portion 21 thereof which is adapted to engage the flange 11 and a dip tube adaptor 22, comprising an essentially tubular part providing a central chamber 23 for receiving the extension 13 and terminating in an annular bearing surface 24 engaging the undersurface of the flange 11. The adaptor 22 has recessed means 25 circumferentially of the side walls thereof, into which the alined portions of the container part 19 are deformed in a conventional way to provide firm clamping engagement with the flange 11. The other end of the adaptor 22 is provided with a reduced coupling end 26 for attachment of a suitable dip tube 27 providing delivery of fluid under pressure from the body of the container to the chamber 23.

It will be noted that the inner diameter or bore of the chamber 23 is sufficiently large to provide slight clearance or spacing from the ribs 15, as seen at 28 in FIGS. 1 and 2 of the drawing. This spacing should be sufficiently large to permit the rocking or flexing movement of the flange 11 and ribs 15, as shown in FIG. 2 of the drawing, and, to a certain extent, the sensitivity of the device can be modified by increasing or decreasing this clearance. For example, decreasing the clearance 28 will result in a greater downward force and smaller downward movement of the flange 11 peripherally of the aperture 12 to provide a given opening movement at the end 14 of the device; whereas, increasing the clearance 28 will enable a similar opening movement at the end 14 of the device to be produced by a lesser downward force and somewhat greater downward movement peripherally of the aperture 12.

For purpose of illustration, the valve device, as shown in FIGS. 1, 2 and 3, is provided with an integral tubular member 29 peripherally of the aperture 12 in the flange 11 which provides means for mounting a combination discharge nozzle and operating button 30 to adapt the device to a directed aerosol spray. The operating button 30 is shown as having a central chamber 31 registering with a slightly larger bore 32 receiving the tubular member 29 and providing a bearing 33 to position the same on said tubular member. The chamber 31 also registers with a discharge orifice 34 having an enlarged outer end 35 providing a directed discharge of an aerosol spray. The upper surface 36 of the button 30, suitably inclined in the direction of the nozzle aperture 34, 35, provides a finger engaging portion for actuation of the valve. Downward pressure on the button 30 is transmitted through the tubular member 29 to the flange 11 peripherally of the aperture 12 therein. It will be understood, however, that the details of the particular operating button and nozzle 30 and the mounting thereof represent but one of many types of mountings of the novel valve device with aerosol discharge means; and any suitable engagement can be provided with various aerosol discharge means for foam, paste, mist spray and the like which will engage the valve device in a manner to facilitate the desired downward movement of the flange 11 peripherally of the aperture 12 for actuating the valve in the pressure discharge of fluidized material from a container.

When the tubular member 29 is employed, as in FIGS. 1 to 3 of the drawing, it can be fashioned from the same flexibly resilient material as the flange 11 and extension 13 with the necessary firmness or rigidity being provided by a wall thickness somewhat greater than the wall thickness in the extension 13. Thus, the device, as shown in FIG. 3, either with or without the tubular member 29 constitutes a valve device in accordance with the present invention.

Brief reference should be made to FIGS. 4 to 6 of the drawing which show representative cross-sections through the device as shown in FIG. 3, whereas, the inner cross-section of the extension 13 is essentially circular adjacent the flange 11, the portions thereof in alinement with the ribs 15 become closer together than the remaining portions as one moves toward the closure end 14, FIG. 5 being illustrative of an intermediate position. Adjacent the closure end 14, where the extension walls come into juxtaposition, it will be evident that the straight line contact, as shown in FIG. 6, is characteristic of a device having only two ribs 15. When three such ribs are employed, the juxtaposed walls would meet in an equilateral Y pattern; whereas, with four ribs 14, the juxtaposed wall portions would meet as a cross or X pattern.

In FIG. 7 of the drawing, there is shown a slight modification of the device as shown in FIGS. 1 and 2, wherein a rigid stiffening member 37 is embedded in the device with a short leg 38 within the flange 11' and a long leg 39 within the rib 15', it being understood that a reinforcing member 37 would be arranged within each of the plurality of ribs 15'. The righthand portion "a" of FIG. 7 shows the reinforced device in the closed position; whereas, the lefthand portion "b" shows the device in the open position, with the central hub portion including the tubular member 29', the center of the flange 11' and the extension 13' deflected downwardly, providing a fluid passage through the closure end 14'. The slight movement of the short end 38 of the stiffening member within the flange 11' during flexing of the device is taken up internally by the inherent resilient flexibility of the materials; thus, the stiffening members do not in any way interfere with the functioning of the device other than possibly requiring a slight increase in downward pressure to produce the desired movement at the closure end 14'.

The stiffening members 37 can readily be molded in place in the fashioning of the device by inserting in the mold cavity initial stiffening members 37 having extensions 37a joined therewith at a weakened portion 37b. While positioning support of the mold is provided by the portion 37a, this portion is broken off after molding at the weakened portion 37b and, hence, is shown in dotted lines in FIG. 7 of the drawing since it forms no part of the finished article.

One advantage of the provision of the reinforcing members 37 in the device is that it permits adjustment of the sensitivity of the device after manufacture by reforming to slightly vary the angularity between the short leg 38 and the long leg 39 of the stiffening members 37. Thus, for example, by molding the device with the reinforcing members 37 in place, thereafter re-forming the device to increase the angularity between the short leg 38 and long leg 39 would have the effect of adding a supplemental closing action to the valve device, increasing the extent of the juxtaposed area 16 (note FIG. 3). In such instances, the extent of downward movement of the flange 11' peripherally of the aperture 12' sufficient to cause opening movement at the end 14' of the valve unit would, of course, be slightly increased. It will be understood, however, that the desirability of such re-forming of the stiffening members 37 after embedding in the device will depend upon the particular conditions to be satisfied in various adaptations of the device to the pressure discharge of fluid materials.

Various changes and modifications in the valve device as herein disclosed will occur to those skilled in the art and, to the extent that such changes and modifications are embraced by the appended claims, it is understood that they constitute part of my invention.

I claim:

1. A valve device formed of flexibly resilient material comprising an essentially tubular thin walled body part having an elongated tapered portion extending from a cylindrical cross-section to a lower end of flattened cross-section providing an elongated slit normally forming a fluid tight closure preventing upward flow of fluid through said device, a circumferential flange protruding outwardly from said body part at the juncture of the cylindrical and tapered portion thereof and perpendicularly to the axis of said body part, said flange being of sufficient radial dimension to provide a peripheral mounting zone for mounting engagement with a container and an intermediate circumferential zone between said mounting zone and body part, the flexibility in said intermediate zone permitting axial movement of the body part with respect to said peripheral mounting zone, and said tapered portion having diametrically opposed axial stiffening means commencing at mid-points of the flat sides of the lower end thereof and extending to and integrally joining the intermediate circumferential zone of said flange, said stiffening means at the diametrically opposed points of juncture with said flange extending radially from said body part to points closely adjacent said peripheral mounting zone, whereby downward movement of said body part with respect to said peripheral mounting zone actuates said valve to permit upward flow of fluid therethrough by imparting a rocking motion to said stiffening means and separation of the lower ends thereof to form a fluid opening at the slit end of said device.

2. A valve device as defined in claim 1 wherein said stiffening means comprise integral rib members protruding outwardly from opposed sides of said tapered portion.

3. A valve device as defined in claim 1 wherein said stiffening means comprise rigid insert members embedded in the material of said device.

4. A valve device as defined in claim 1 wherein said stiffening means comprise rigid insert members embedded in the material of said device, said rigid members having angularly offset portions disposed radially in the flange of said device.

5. A valve device as defined in claim 1 wherein said stiffening means comprise integral rib members protruding outwardly from opposed sides of said tapered portion, said rib members having rigid inserts embedded therein and extending longitudinally thereof.

6. A valve device as defined in claim 1 wherein said body part includes above said flange a cylindrical extension having an inner diameter equal to and continuous with the inner diameter of the cylindrical end of said tapered portion, and an outer diameter which is greater than the outer diameter of said cylindrical end of the tapered portion but substantially less than the inner diameter of the mounting zone of said flange.

7. A valve device as defined in claim 1 wherein said body part includes above said flange a cylindrical extension having an inner diameter equal to and continuous with the inner diameter of the cylindrical end of said tapered portion, and an outer diameter which is greater than the outer diameter of said cylindrical end of the tapered portion but substantially less than the inner diameter of the mounting zone of said flange, and said cylindrical extension being sufficiently rigid to resist deformation in the application of downward axial pressure required to actuate said valve.

References Cited in the file of this patent

UNITED STATES PATENTS

| 1,051,554 | Champion | Jan. 28, 1913 |
| 1,700,364 | Bishop et al. | Jan. 29, 1929 |
| 2,255,467 | Kabriel | Sept. 9, 1941 |
| 2,513,272 | Bowen | July 4, 1950 |
| 2,550,132 | Woods | Apr. 24, 1951 |
| 2,730,274 | Brown | Jan. 10, 1956 |

FOREIGN PATENTS

| 560,545 | Great Britain | Apr. 7, 1944 |